Nov. 27, 1945.  J. BARDEGA  2,389,886
UNIVERSAL ROTARY DRIVE LOCK
Filed July 17, 1944
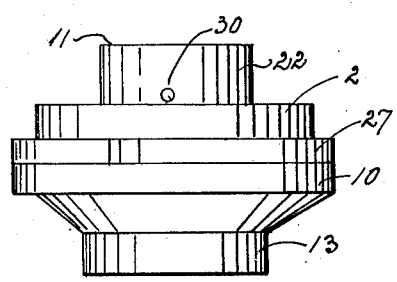
FIG-1-
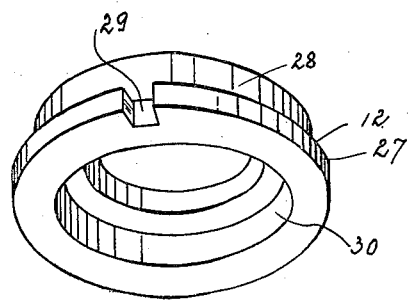
FIG-2-
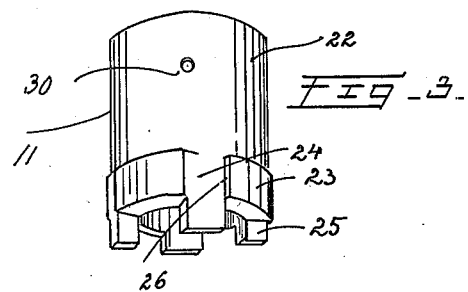
FIG-3-
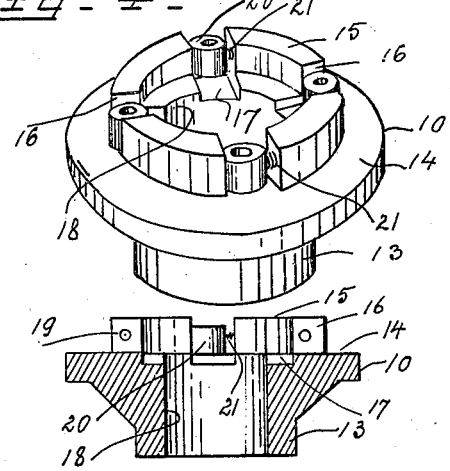
FIG-4-
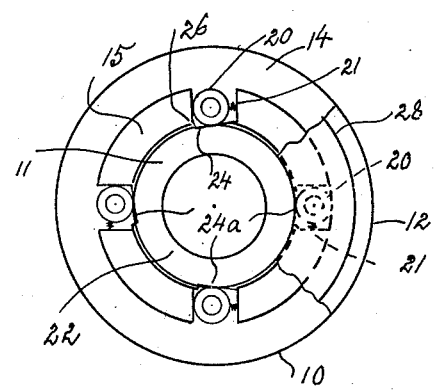
FIG-5-
FIG-6-
INVENTOR.
Joseph Bardega
BY Louis Chayka
Attorney Patented Nov. 27, 1945

2,389,886

UNITED STATES PATENT OFFICE 2,389,886

UNIVERSAL ROTARY DRIVE LOCK

Joseph Bardega, Detroit, Mich.

Application July 17, 1944, Serial No. 545,366

3 Claims. (Cl. 192—8)

The purpose of my invention is to provide a lock which will make it possible to couple two axially aligned shafts so that rotary motion of one shaft may be transmitted to the other, but where such transmission of rotary motion in the opposite direction is not possible. One suggested application of the lock is in the steering rod of an automobile. The use of the device would not interfere at all with free steering of the vehicle by means of the steering wheel, but the device would lock the steering rod against any rotary movement on an impulse from the opposite direction. The device thus employed would be a means of preventing any sudden swerving of the vehicle owing to a sudden deflation of one of its tires or some other reason.

It will be understood that my device is not restricted to any particular use, but that it may be employed in any mechanism, machine or combination of elements in which the transmission of rotary motion is desirable only when transmitted by one of the coupled shafts and not by the other.

I shall now describe my improved lock with reference to the accompanying drawing in which, Fig. 1 is a side elevation of my lock;

Figs. 2, 3, and 4 are perspective views of main parts of my lock in what is known as an exploded view;

Fig. 5 is a plan view of the driving member of my lock with a fragmentary plan view of a stationary member, fitting over said driving member;

Fig. 6 is a vertical sectional view of the driving member shown in Fig. 4.

Similar numerals refer to similar parts throughout the several views.

The lock of my construction employs three basic parts, the driving member 10, the driven member 11 and a stationary member 12 to join the above named two members together. The driving member includes a cylindrical collar 13, flaring into a flange 14. Rising from the surface of the flange are four segments 15 of what, except for the intervening spaces between them, would be a ring concentric with said flange. The spaces between segments 15 form radial slots 16. Adjoining said slots in a radial disposition, inwardly of said segments 15, are recesses 17 intersecting the inner wall 18 of collar 13. Located in each slot is a roller 20, the diameter of which is slightly in excess of the thickness of the adjoining segments. Four such rollers are shown in Fig. 4 and in Fig. 5, but it will be understood that the number is not critical and that other number or rollers, preferably divisible by two, may be employed, only one roller being employed in each respective slot. A small coiled spring 21, anchored in hole 19 in the end wall of each slot 16, bears against the side of the roller bringing it into abutment with the opposite wall of the slot. However, it will be noticed that one half of the rollers are urged by their respective springs in one direction and that the other half of the rollers are urged in the opposite direction. This is best shown in Fig. 5.

The driven member 11, includes a cylindrical body 22, adapted to accommodate a shaft to be driven as a unit with said member and has a belt, that is an expanded annular portion 23 which contains four planes 24, extending from the surface of the belt into the cylindrical body 22, the arrangement resulting in formation of a shoulder 26. At the lower end the driven member 11, is provided with four coupling tongues 25. When member 11 is set in place in the driving member 10, said tongues fit into recesses 17, while rollers 20 bear against the surfaces of the respective planes 24. This is shown in Fig. 5. Members 10 and 11 are clamped in an operative position with respect to each other by means of member 12, the lower surface of which abuts the upper surface of flange 14, while driven member 11 passes through the central aperture in member 12 as shown in the drawing.

A cotter pin, not shown, may be inserted into hole 30 when parts 10 and 11 are positioned in place, to prevent said parts from coming apart.

I shall now describe the operation of my lock. It will be assumed that member 12 is held in a stationary position. A slot 29 in flange 27 serves as a means of keying it to a stationary support. When the driving member 10 is imparted a rotary motion, as by a shaft keyed within said member in collar 13, member 11 will rotate with member 10 because tongues 25 interlock with said member 10 by means of recesses 17. While member 10 is being rotated, rollers 20, between segments 15, are carried around in what is the inner race 30 of member 12. Should, however, the rotary impulse come from the direction of the driven member 11, said rollers bearing against planes 24 will prevent any substantial rotary movement.

For explanation, the roller shown in top position in Fig. 5 and the adjoining plane 24 will best serve the purpose. The roller rests on the lowest portion of plane 24 bearing against the end wall of one segment 15. Spring 21 keeps it in that position. There being a slight play between the sides of tongues 25 and the sides of recesses 17, it is possible to impart to member 11 a limited rotary motion with respect to member 10. When member 11 is turned to the left with respect to member 10, plane 24 disposed angularly under said roller will push the roller outwardly in a cam action into a binding contact with the surface of race 30 in member 12. This will prevent the rotation of member 11 and member 12. If an attempt is made to rotate member 11 in the opposite direction, to the right, the adjoining plane 24a will push out the roller against said race 30 into a binding contact therewith. In other words, whether member 11 is turned to the right or to the left, it will result in a binding engagement between said member and between the stationary coupling member 12, so that no rotary motion will be transmitted to member 10.

It will be seen that some changes may be made in the construction and combination of parts shown in my lock without departing from the inventive principle disclosed therein. What I, therefore, wish to claim is as follows:

1. A lock of the kind described including a driving member, cylindrical in form and provided with a lateral flange, a plurality of segments rising from the surface of said flange in a concentric arrangement thereto, said segments being spaced from each other to form radial slots, a plurality of radial recesses in the body of the driving member, inwardly of the segments, a roller in each slot, a driven member in the form of a hollow cylinder, having at end a plurality of tongues, in the direction of its axis, to fit into said recesses with allowance for play in the direction of rotation, the driven member having an expanded annular portion with a plurality of spaced planes each bearing against a respective roller at an angle to a line between the center of the driving member and the center of the roller, a cylindrical member to couple the driving and driven members, said member having an inner race abutting the outer surfaces of the rollers, and means to secure the coupling member in its place.

2. A universal rotary drive lock of the kind described, comprising, a cylindrical driving member including at one end a plurality of segments in a concentric arrangement with respect to said member, the segments being spaced from each other to form radial slots, a roller in each slot, said driving member having in said end a plurality of radial recesses spaced from each other, a cylindrical driven member, having at one end a plurality of tongues fitting into said recesses with allowance for play in the direction of rotation for a limited rotary movement of the driven member with respect to the driving member, the driven member having a plurality of spaced flat surfaces, each bearing against a respective roller, outwardly, at an oblique angle to the radius of the driven member, and a stationary coupling member to keep the driving and the driven members in operative union, and having an inner race in contact with said rollers.

3. A rotary drive lock of the kind described, comprising, a cylindrical driving member including at one end a plurality of segments in a concentric arrangement with respect to said member, the segments being spaced from each other to form radial slots, a roller in each slot, said driving member having in said end a plurality of radial recesses spaced from each other and in line with said slots, a cylindrical driven member having at one end a plurality of tongues fitting into said recesses with allowance for play in the direction of rotation for a limited rotary movement of the driven member with respect to the driving member, the driven member having a plurality of spaced, flat surfaces, each bearing against a respective roller, outwardly, at an oblique angle to the radius of the driven member, the inclination of the angles of one half of the number of said surfaces being opposed to the inclination of the angles of the remaining surfaces, and a stationary coupling member to keep the driving and the driven members in operative union, and having an inner race in contact with the outer surfaces of said rollers.

JOSEPH BARDEGA.